(12) United States Patent
Tamura (10) Patent No.: US 8,274,664 B2
(45) Date of Patent: Sep. 25, 2012

(54) IMAGE FORMING APPARATUS WITH IMAGE READING UNIT INCLUDING CONTACT GLASS

(75) Inventor: Takashi Tamura, Osaka (JP)

(73) Assignee: Kyocera Mita Corporation (JP)

( * ) Notice: Subject to any disclaimer, the term of this patent is extended or adjusted under 35 U.S.C. 154(b) by 960 days.

(21) Appl. No.: 12/330,258

(22) Filed: Dec. 8, 2008

(65) Prior Publication Data

US 2009/0147324 A1    Jun. 11, 2009

(30) Foreign Application Priority Data

Dec. 10, 2007 (JP) ................. 2007-318262
Dec. 10, 2007 (JP) ................. 2007-318264

(51) Int. Cl.
*G06F 3/12* (2006.01)
*H04N 1/00* (2006.01)

(52) U.S. Cl. ................ 358/1.1; 358/401; 358/474

(58) Field of Classification Search .......... 358/1.1, 358/400, 401, 474, 488, 500, 501, 505
See application file for complete search history.

(56) References Cited

U.S. PATENT DOCUMENTS

2006/0008292 A1* 1/2006 Watanabe ............... 399/107

FOREIGN PATENT DOCUMENTS

| JP | 62246042 | 10/1987 |
|---|---|---|
| JP | 2-98554 | 8/1990 |
| JP | 574071 | 10/1993 |
| JP | 7196203 | 8/1995 |
| JP | 1195340 | 4/1999 |
| JP | 2004-10333 | 1/2004 |
| JP | 2006-52077 | 2/2006 |
| JP | 200774614 | 3/2007 |

* cited by examiner

*Primary Examiner* — Thomas D Lee (74) *Attorney, Agent, or Firm* — Gerald E. Hespos; Michael J. Porco (57) ABSTRACT

An image forming apparatus is provided with an image reading unit for reading the image information of a document and an image forming unit for performing a specified image forming process based on this image information. The image reading unit includes a contact glass on which a document to have image information read therefrom is to be placed, an image reading unit main body on which the contact glass is mounted, a document pressing member openable and closable to press a document placed on the contact glass, and an optical member for optically scanning a document surface of the document placed on the contact glass to read as a document image. The image reading unit main body includes a top panel formed with an opening covered by the contact glass and the outer surface of the top panel is in a dark color.

14 Claims, 6 Drawing Sheets

IMAGE FORMING APPARATUS WITH IMAGE READING UNIT INCLUDING CONTACT GLASS

FIELD OF THE INVENTION

The present invention relates to an image forming apparatus with an image reading unit including a contact glass on which a document to have image information read therefrom is placed.

DESCRIPTION OF THE RELATED ART

In an image forming apparatus such as a copier or a facsimile machine, a document reading unit for reading the image of a document is normally provided atop an apparatus main body. The image information of the document read by this document reading unit is fed to a specified image forming process in an image forming unit arranged below the document reading unit. A toner image obtained as a result of the image forming process is transferred to a sheet fed from a sheet feeding unit. The sheet after a transfer process is discharged to the outside after a fixing process for the toner image is performed.

The document reading unit includes a reading unit main body having a flat box shape and contact glasses to be mounted in a top panel of the reading unit main body. The contact glasses include a placed document glass on which a document is manually placed and an automatic reading glass arranged on a passage path of a document automatically fed. The document reading unit further includes a document pressing member for pressing a document on the contact glass (placed document glass) and an optical system for irradiating a document surface on the contact glass with light from a light source and reading a document image by reflected light.

If a document is the one to be manually placed, a user opens the document pressing member to expose the contact glass and presses a start button with the document pressing member closed to press the document after the document is placed on the placed document glass. Then, the optical system is driven to read a document image.

In order to optically read the document, the document surface is irradiated with the light from the light source via the contact glass and the reflected light is inputted to an image sensor including a CCD (charge coupled device). The reflected light is photoelectrically converted in the image sensor to convert the image information into an electrical signal. In this case, since it is necessary to properly input the reflected light by the document surface to the CCD without being misled by disturbance, black paint is applied to the surface of a substrate around the CCD so that no reflected light is produced by the substrate, for example, as disclosed in Japanese Utility Model Publication No. H02-98554.

The top panel of the reading unit main body is generally in a bright color such as white or ivory. Accordingly, when a document is placed on the contact glass, it is difficult to distinguish the white color of this document and the color of the top panel, wherefore there has been a problem of being difficult to quickly and precisely place the document at a specified position on the contact glass.

SUMMARY OF THE INVENTION

An object of the present invention is to enable a document to be quickly and properly placed on a contact glass by making the document placed on the contact glass easily visible.

In order to accomplish this object, one aspect of the present invention is directed to an image forming apparatus, comprising an image reading unit for reading the image information of a document; and an image forming unit arranged below the image reading unit for performing a specified image forming process based on the image information read by the image reading unit, wherein the image reading unit includes a contact glass on which a document to have image information read therefrom is to be placed; an image reading unit main body on which the contact glass is mounted; a document pressing member openable and closable to press a document placed on the contact glass; and an optical member for optically scanning a document surface of the document placed on the contact glass to read as a document image, wherein the image reading unit main body includes a top panel formed with an opening covered by the contact glass and the outer surface of the top panel is in a dark color.

BRIEF DESCRIPTION OF THE DRAWINGS

FIGS. 1A and 1B are perspective views showing an image forming apparatus according to a first embodiment of the invention, wherein FIG. 1A shows a state where a document pressing member is closed and FIG. 1B shows a state where the document pressing member is opened, FIGS. 2A and 2B are sections along IIA-IIA and IIB-IIB of FIG. 1A, FIGS. 3A and 3B are plan views of the upper surface of an image reading unit housing, wherein FIG. 3A shows a state where a document is properly placed on a placed document glass and FIG. 3B shows a state where a document is obliquely placed on the placed document glass, FIGS. 4A and 4B are perspective views showing an image forming apparatus according to a second embodiment of the invention, wherein FIG. 4A shows a state where a document pressing member is closed and FIG. 4B shows a state where the document pressing member is opened.

DETAILED DESCRIPTION OF THE PREFERRED EMBODIMENTS

Figure 1A:
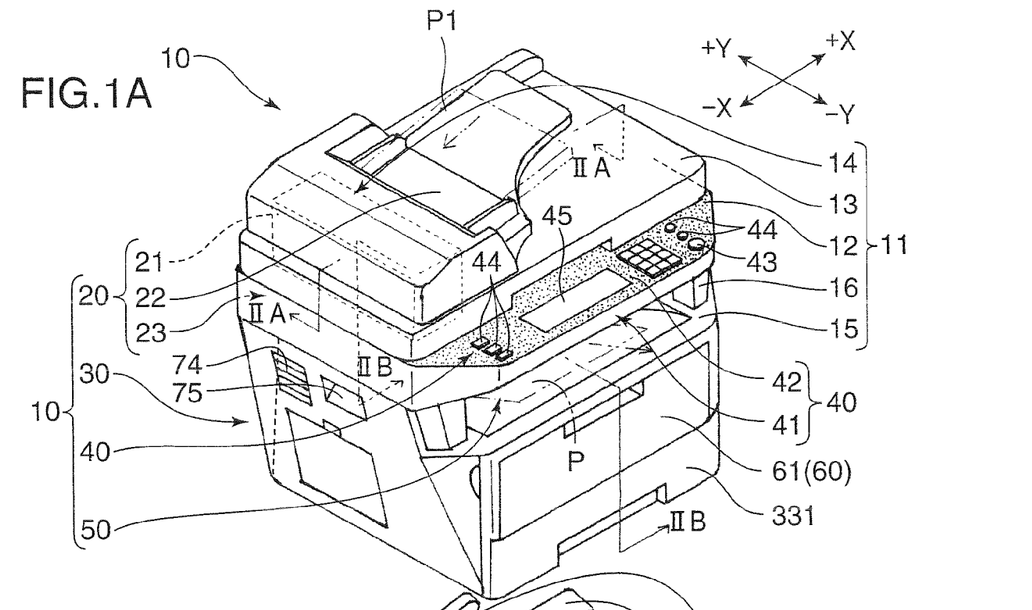
Figure 1B:
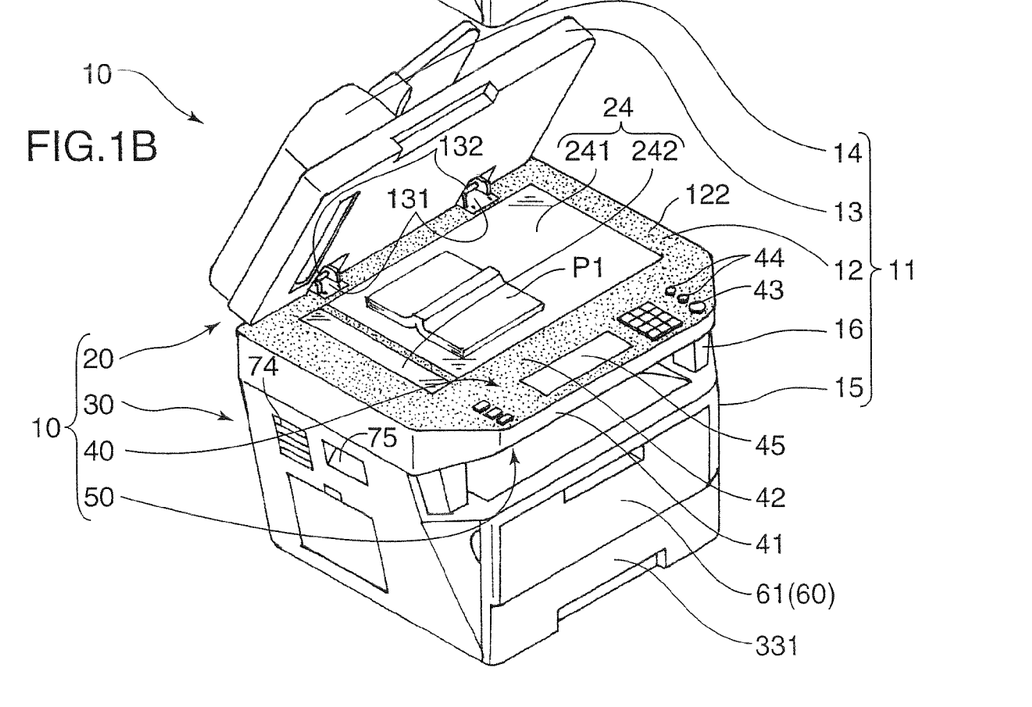
Figure 2A:
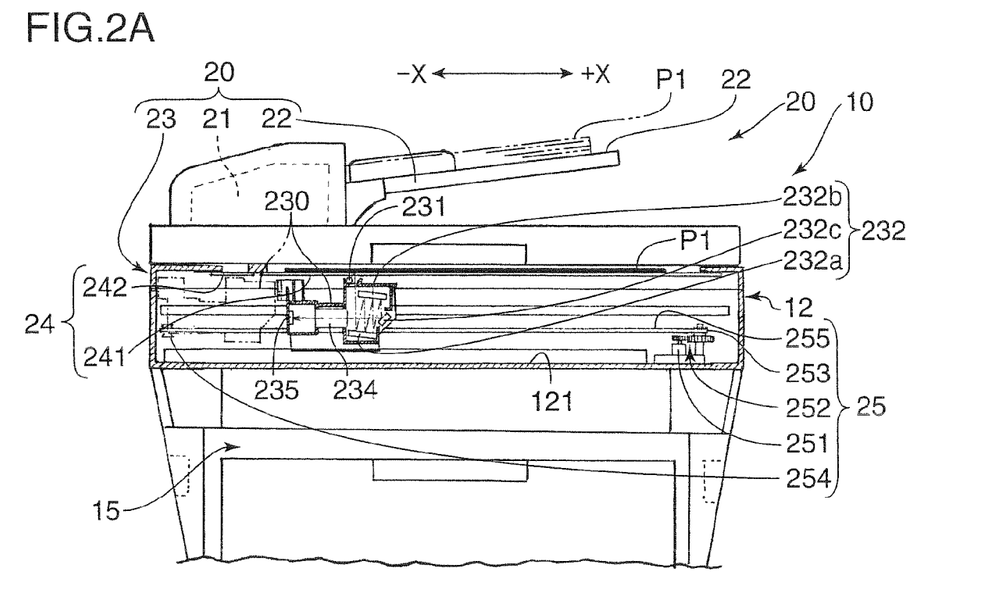
Figure 2B:
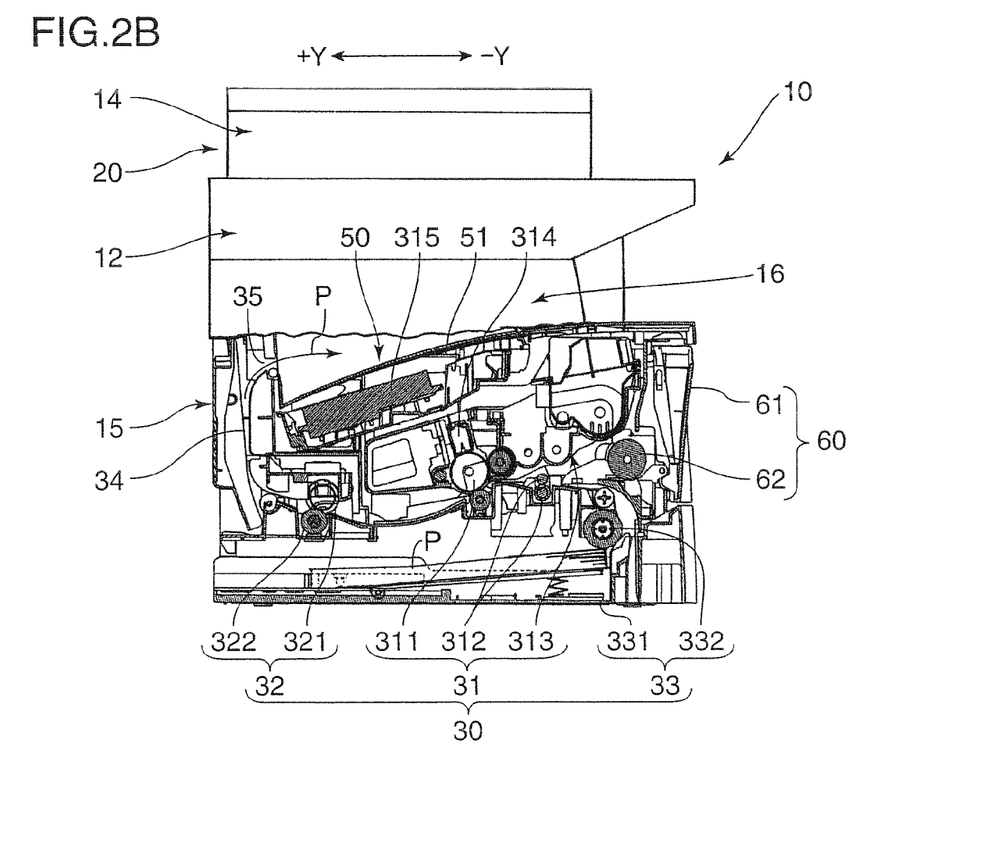

Hereinafter, embodiments of the present invention are described in detail with reference to the accompanying drawings. FIGS. 1A and 1B are perspective views showing an image forming apparatus 10 according to a first embodiment of the invention, wherein FIG. 1A shows a state where a document pressing member 13 is closed and FIG. 1B shows a state where the document pressing member 13 is opened, and FIGS. 2A and 2B are sections along IIA-IIA and IIB-IIB of FIG. 1A. In FIGS. 1A to 2B, X-X directions are referred to as lateral directions and Y-Y directions are referred to as forward and backward directions. Particularly, −X direction is referred to as a leftward direction, +X direction as a rightward direction, −Y direction as a forward direction and +Y direction as a backward direction.

The image forming apparatus 10 is provided with a document reading unit 20 for reading an image formed on a document, an image forming unit 30 arranged below the document reading unit 20, an operation unit 40 projecting forward from a front position of the document reading unit 20 and a sheet discharging unit 50 to which a sheet P having an image forming process performed by the image forming unit 30 is discharged. These units are accommodated in a housing 11.

The housing 11 includes an image reading unit housing 12 (image reading unit main body), the document pressing member 13, an automatic document feeding unit housing 14 and an image forming unit housing 15. The image reading unit housing 12 is in the form of a flat rectangular parallelepiped and houses an optical unit 12 (optical members) as a constituent element of the document reading unit 20. The document pressing member 13 is openably and closably placed atop the image reading unit housing 12. The automatic document feeding unit housing 14 is arranged on the document pressing member 13 and houses an automatic document feeder 21 to be described later. The image forming unit housing 15 is arranged below the image reading unit housing 12 and houses the image forming unit 30. The automatic document feeding unit housing 14 is arranged at a substantially left half position of the document pressing member 13.

Connecting portions 16 are provided between the image reading unit housing 12 and the image forming unit housing 15. The connecting portions 16 respectively stand at the lateral end positions of the image forming unit housing 15 to support the image reading unit housing 12. The sheet discharging unit 50 is formed in a space defined between the automatic document feeding unit housing 14 and the image forming unit housing 15 by the presence of the connecting portions 16. Thus, the image forming apparatus 10 according to this embodiment is called to be of the internal discharging type.

In this embodiment, a conveying direction of a document P1 in the document reading unit 20 and a conveying direction of a sheet P in the image forming unit 30 are set orthogonal to each other. Specifically, as shown by arrows of chain double-dashed line in FIG. 1A, the document P1 is conveyed in a lateral direction, whereas the sheet P is conveyed along forward and backward directions.

This direction setting is made for the following reason. Specifically, when a user places documents P1 on a document tray 22 atop the housing 11, it is preferable to horizontally orient the documents P1 when viewed from the user facing the front side of the image forming unit housing 15 in order for the user to visually confirm a placed state of the documents P1 (particularly a state as to whether or not the leading end of a stack of documents is reliably located at a mount position). On the other hand, in the case of the sheet discharging unit 50 of the internal discharging type, it is convenient to discharge the sheet toward the user since a stack of sheets P can be easily pulled out from the sheet discharging unit 50. In order to satisfy these two conditions, the conveying direction of the document P1 and that of the sheet P are set orthogonal to each other.

The document reading unit 20 includes the automatic document feeder 21, the document tray 22 and the optical unit 23. The automatic document feeder 21 automatically feeds documents to a specified image reading position (automatically fed document glass 242). The document tray 22 is provided to have a stack of documents P1 to be fed by the automatic document feeder 21 placed thereon and extends obliquely upward to the right from a right opening of the automatic document feeder 21. The optical unit 23 optically reads an image of a document, which comes to face a contact glass 24 to be described later.

A large rectangular upper opening is formed in a top panel 122 of the image reading unit housing 12. The contact glasses 24, with which an image formation surface of a document comes into contact, are fitted in the opening of this top panel 122. The contact glasses 24 include a placed document glass 241 (hereinafter, "first glass 241") substantially covering a central part of the upper surface of the image reading unit housing 12 and the automatically fed document glass 242 (hereinafter, "second glass 242") arranged immediately to the left of the first glass 241 and narrow and long in forward and backward directions.

The document pressing member 13 has the rear edge thereof connected with the upper surface of a rear edge portion of the image reading unit housing 12 via a pair of hinge members 131 spaced apart in the lateral direction. By being rotated in forward and reverse directions about the respective hinge members 132, the document pressing member 13 can be displaced between a closing posture to close the contact glasses 24 (see FIG. 1A) and an exposing posture to expose the contact glasses 24 (see FIG. 1B).

For example, in the case of reading a document image of a thick document P1 such as a book document, the user places this document P1 on the first glass 241 such that a document surface is in close contact with the document pressing member 13 opened. Thereafter, an image on the document surface is read by the optical unit 23 with the document pressing member 13 closed.

In contrast, in the case of reading images of documents P1 from a stack of thin documents P1, the user sets the document pressing member 13 in the closing posture (see FIG. 1A) and places the stack of documents on the document tray 22. If a start button 43 is pressed in this state, the documents P1 are fed one by one toward the second glass 242 from the stack of documents on the document tray 22 by a specified operation of automatic document feeder 21. When the document surface of the document P1 passes above the second glass 242, the document image is read by the optical unit 23.

Next, the optical unit 23 is described with reference to FIG. 2A. The optical unit 23 is of the so-called CCD moving type and includes a movable frame 230 movable in the lateral directions, an irradiation lamp 231 housed in this movable frame 230, a plurality of reflection mirrors 232 for further reflecting reflected light of light irradiated by the irradiation lamp 231 from the document surface, a lens unit 234 for condensing the reflected light from the reflection mirrors 232 to adjust a focal length, and a CCD image sensor 235 for converting image information represented by the incident light from the lens unit 234 into an electrical signal. The irradiation lamp 231 is arranged at an upper position slightly closer to the right side than a lateral center position in the movable frame 230.

The reflection mirrors 232 are arranged at right half positions in the movable frame 230 and include three mirrors of a first mirror 232a, a second mirror 232b and a third mirror 232c. The first mirror 232a first receives the reflected light of the light irradiated by the irradiation lamp 231 from the document P1 and reflects it. The second mirror 232b receives the reflected light of the first mirror 232a and further reflects it. The third mirror 232c further reflects the reflected light from the second mirror 232b such that the reflected light is incident on the lens unit 234. The third mirror 232c is formed by a concave mirror and the lens unit 234 is arranged at a focus position thereof.

The lens unit 234 is arranged at a substantially center position in forward and backward directions in the movable frame 230. The CCD image sensor 235 is arranged at a substantially center position in forward and backward directions in the movable frame 230 and immediately to the left of the lens unit 234. The light condensed by the lens unit 234 is directly irradiated to the CCD image sensor 235. The CCD image sensor 235, on which the light from the lens unit 234 was incident, converts this light into an analog electrical signal corresponding to its intensity. This analog electrical signal is digitized and is outputted to an exposure device 315 of the image forming unit 30 via a specified memory device.

The optical unit 23 includes a moving mechanism 25 for moving the movable frame 230. The moving mechanism 25 includes a drive motor 251 mounted at the right end of a bottom plate 121 in the image reading unit housing 12, a gear mechanism 252 for transmitting a driving force of the drive motor 251 in a decelerated state, a drive pulley 253 to which the driving force of the drive motor 251 is transmitted via the gear mechanism 252, a driven pulley 254 arranged at a left end position of the bottom plate 121 to face the drive pulley 253 and a scanner belt 255 mounted between the driven pulley 254 and the drive pulley 253. A part of the scanner belt 255 is fixed to a specified position of the movable frame 230.

According to such a moving mechanism 25, the driving force is transmitted to the drive pulley 253 in a decelerated state via the gear mechanism 252 by driving the drive motor 251 in forward and reverse directions. In this way, the scanner belt 255 turns between the drive pulley 253 and the driven pulley 254 and the optical unit 23 fixed to the scanner belt 255 is moved in forward and reverse directions.

Accordingly, upon reading the document surface of the document P1 placed on the first glass 241 by the user, the image of the document P1 on the first glass 241 is scanned by light from the irradiation lamp 231 while the movable frame 230 is moved rightward from a left end position (home position) in the image reading unit housing 12 by the turning movement of the scanner belt 255. Reflected light by this scanning is inputted to the CCD image sensor 235 via the reflection mirrors 232 and the lens unit 234 to have the document image read.

On the other hand, in the case of reading images of the respective documents by dispensing the documents P1 one by one from a stack of the documents P1 placed on the document tray 22, the movable frame 230 is kept stationary at the home position. In this state, the automatic document feeder 21 is driven to dispense the documents P1 one by one from the stack of the documents and the irradiation lamp 231 is turned on in synchronism with a timing at which the document surface of the document P1 faces the second glass 242. Reflected lights from the document surfaces when the document surfaces successively pass the second glass 242 are read by the CCD image sensor 235.

Next, with reference to FIG. 2B, the image forming unit 30 is outlined. The image forming unit 30 includes a transfer device 31 for transferring a document image read by the image reading unit 20 in the form of a toner image to a sheet, a fixing device 32 for fixing the toner image on the sheet transferred in the transfer device 31, a sheet storing portion 33 for storing sheets to be fed toward the transfer device 31, a charger 314 and the exposure device 315. These constituent elements are housed in the box-shaped image forming unit housing 15.

The transfer device 31 includes a photoconductive drum 311 for successively forming an electrostatic latent image and a toner image on the circumferential surface thereof, a pair of registration rollers 312 for feeding a sheet to the circumferential surface of the photoconductive drum 311 at a specified timing, and a developing device 313 for supplying toner to the circumferential surface of the photoconductive drum 311.

The charger 314 uniformly charges the circumferential surface of the photoconductive drum 311. The exposure device 315 irradiates the circumferential surface of the photoconductive drum 311 with a laser beam based on the image information of the document read by the scanning in the optical unit 23 and stored in the memory device. The photoconductive drum 311 is uniformly charged by the charger 314 while being rotated about its axial center and, then, laser beams are irradiated from the exposure device 315 to successively form electrostatic latent images on the circumferential surface of the photoconductive drum 311. The toner is supplied to the electrostatic latent image from the developing device 313 to form a toner image on the circumferential surface of the photoconductive drum 311. The toner image on the circumferential surface of the photoconductive drum 311 is transferred to a sheet P fed via the pair of registration rollers 312.

The fixing device 32 applies a fixing process to the sheet P having the toner image transferred thereto in the transfer device 31. Such a fixing device 32 includes a fixing roller 321 accommodating an electric heating element such as a halogen lamp therein and a pressure roller 322 arranged to face the fixing roller 321 from below.

The sheet P conveyed from the transfer device 31 by the rotation of the photoconductive drum 311 is fed to between the fixing roller 321 and the pressure roller 322. By being heated by the fixing roller 321, the toner image is fixed to the sheet P. The sheet P having passed the fixing device 32 passes a conveyance path 34 provided at a more downstream end and is discharged to the sheet discharging unit 50 through a discharge port 35.

The sheet storing portion 33 includes a sheet cassette 331 detachably mountable into the image forming unit housing 15 and a pickup roller 332 disposed in correspondence with one end (front end in an example shown in FIG. 2B) of the sheet cassette 331. Uppermost ones of a stack of sheets P stored in the sheet cassette 331 are successively dispensed by the rotation of the pickup roller 332 to be fed toward the transfer device 31.

The sheet P1 dispensed from the sheet cassette 331 has a toner image on the circumferential surface of the photoconductive drum 311 transferred thereto while being conveyed via the pair of registration rollers 312. Subsequently, the sheet P is discharged along the conveyance path 34 to a discharge tray 51 of the sheet discharging unit 50 through the discharge port 35 after a thermal fixing process by the fixing roller 321 is applied thereto in the fixing device 32.

A manual sheet feeder 60 is provided at a position of the front surface of the image forming unit housing 15. This manual sheet feeder 60 includes an openable and closable manual feed tray 61 and a pickup roller 62 for dispensing a sheet P placed on the manual feed tray 61 in an open state to feed it toward the transfer device 31.

As shown in FIGS. 1A and 1B, the operation unit 40 includes an operation unit housing 41 formed by a forward projecting part of the image reading unit housing 12, and an operation panel 42 formed on the upper surface of this operation unit housing 41. On the operation panel 42 are provided the start button 43, various operation buttons 44, a display 45 which is an LCD (liquid crystal display) for displaying various pieces of image formation information on a screen and the like. The user causes the image forming apparatus 10 to perform a specific image forming process by operating and seeing these operating members.

In the image forming apparatus 10 thus constructed, the outer surface of the top panel 122 of the image reading unit housing 12 is in a color darker than other parts in this embodiment. In this embodiment, the outer surfaces of the document pressing member 13, the automatic document feeding unit housing 14 and the image forming unit housing 15 are all in a light color such as a light cream color or a light gray color, whereas that of the top panel 122 is in the dark color. The hue of the dark color does not matter. For example, the dark color may be a dark red color or a dark blue color. Black can be cited as a most preferable dark color.

In the Munsell value of the Munsell chart (JIS), the color of the top panel 122 is preferably 2 or lower in lightness. Further, a difference in lightness between the color of the top panel 122 and that of the surrounding parts is preferably 3 or higher in the Munsell value of the Munsell chart (JIS).

Figure 3A:
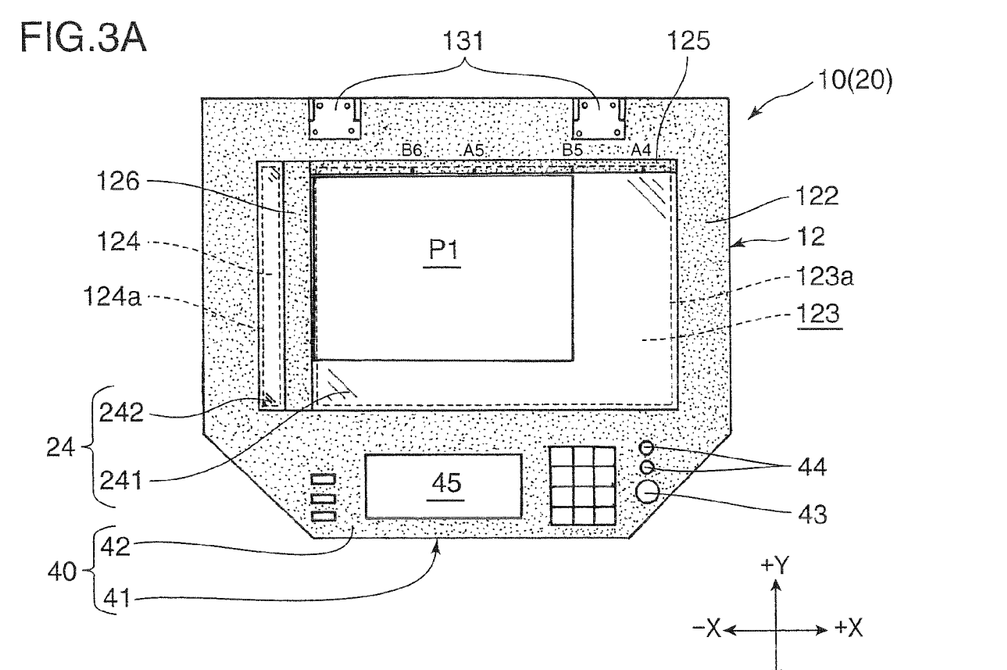
Figure 3B:
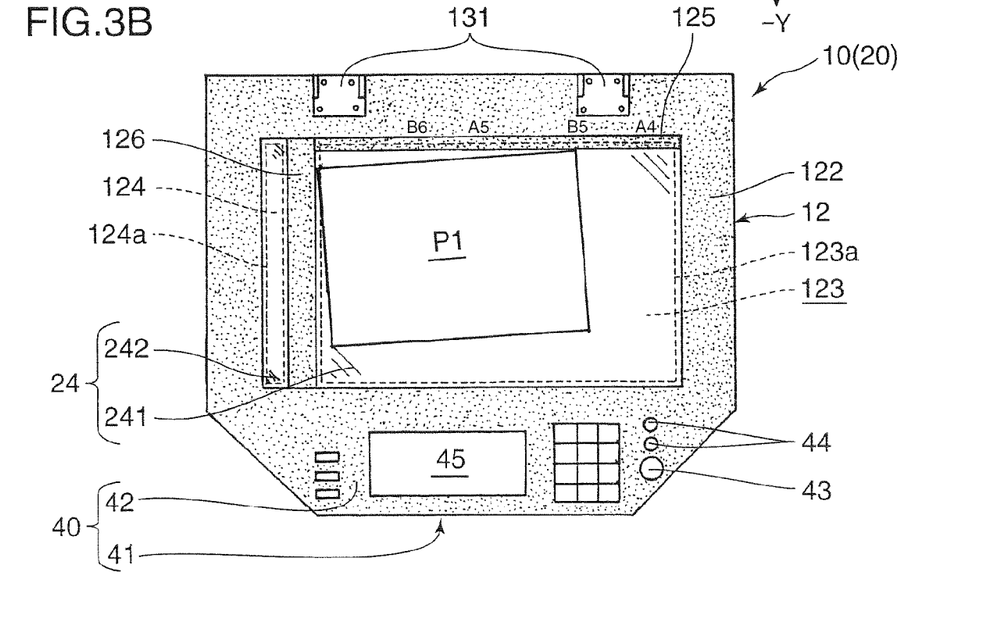

FIGS. 3A and 3B are plan views of the upper surface of the image reading unit housing 12 showing the top panel 122 in the dark color, wherein FIG. 3A shows a state where the document P1 is properly placed on the first glass 241 and FIG. 3B shows a state where the document P1 is obliquely placed on the first glass 241. The indication of directions by X and Y in FIGS. 3A and 3B are the same as in the case shown in FIGS. 1A and 1B (X-X are lateral directions (−X: leftward direction, +X: rightward direction) and Y-Y are forward and backward directions (−Y: forward direction, +Y: backward direction).

The top panel 122 is a plate member constituting the upper surface of the image reading unit housing 12 and formed with a large opening 123 and a small opening 124, in which the contact glasses 24 are fitted. The large opening 123 has a shape substantially analogous to the plan view of the image reading unit housing 12 and is a large rectangular opening formed in a central part of the top panel 122. The small opening 124 is formed to the left of the large opening 123 and narrow and long in forward and backward directions. A surrounding supporting edge 123a is so provided at an edge portion of the large opening 123 as to form a step at a slightly lower position. A surrounding supporting edge 124a is also so provided at an edge portion of the small opening 124 as to form a step at a slightly lower position.

The first glass 241 is fitted into the large opening 123 while being supported by the surrounding supporting edge 123a. The second glass 242 is fitted into the small opening 124 while being supported by the surrounding supporting edge 124a.

A scale 125 extending in the lateral direction over the entire length is bonded to the rear edge of the first glass 241. Markings indicating sheet sizes of documents P1 such as A4, B4 with a left upper corner as a starting point is attached to this scale 125. The user can place the document P1 on the first glass 241 while referring to these markings.

Further, a guiding band 126 long in forward and backward directions is bonded in a narrow section between the first glass 241 and the second glass 242 for guiding the document P1 fed from the document tray 22 (see FIG. 1A) onto the second glass 242 via the automatic document feeder 21 to the upper surface of the document pressing member 13.

In the first embodiment, the entire upper surface of the top panel 122 has the color density thereof set to be in the dark color (dark gray color slightly brighter than black color in this embodiment) and the scale 125 and the guiding band 126 are also in the same dark color.

Accordingly, with the document P1 placed on the first glass 241 while being turned upside down so that the document surface faces downward, a difference between the white color of the underside of the document P1 and the dark color of the top panel 122 stands out to increase contrast. Thus, the placed state of the document P1 can be easily visually confirmed. This particularly contributes to the visibility of users with weak eyesight or color weakness. Accordingly, the user can easily distinguish a state where the document P1 is obliquely placed on the first glass 241 as shown in FIG. 3B.

So-called pearskin finish is applied to the upper surface of the top panel 122 to form fine unevenness. In the case of reading a book document or the like, a clearance is formed between the top panel 122 and the document pressing member 13 even if the document pressing member 13 is closed. In this case, scanning light emitted from the irradiation lamp 231 (FIG. 2A) is reflected by the underside of the document pressing member 13 and further reflected again by the top panel 122. However, since the top panel 122 has a dark color and is pearskin-finished, the reflected light by the top panel 122 is weak and becomes scattered light. Therefore, the occurrence of such an inconvenience that the user feels dazzled by the reflected light from the top panel 122 can be prevented.

In addition, in the first embodiment, parts of the interior of the image reading unit housing 12 which can be seen through the contact glasses 24 (particularly through the first glass 241) are also in a dark color. Specifically, the inner wall surface of the image reading unit housing 12, the inner surface of the bottom plate 121 and the outer surface of the movable frame 230 of the optical unit 23 are in the dark color. By such a coloring process, the placed state of the document P1 can be more easily visually confirmed. In addition, reflected lights of the light irradiated from the irradiation lamp 231 by the respective parts are absorbed by the dark color of the inner wall surface of the image forming unit housing 12 and the like. Thus, it can be suppressed that the user feels dazzled by the reflected lights from the interior of the image reading unit housing 12.

As described above, the outer surface of top panel 122 of the image reading unit housing 12 is in the dark color in the image forming apparatus 10 according to the first embodiment. Thus, color contrast is formed between the dark-color top panel 122 and the light-color document P1 on the first glass 241 with the document P1 placed on the first glass 241. This enables the user to quickly visually judge whether or not the placed state of the document P1 is proper. As a result, the operability of the copying operation can be improved and an inconvenience that an oblique toner image is formed on a sheet can be prevented.

Even if the scanning light is reflected by the underside of the document pressing member 13 to irradiate the top panel 122, this irradiating light is absorbed by the dark color of the top panel 122, wherefore dazzle can be suppressed. Even if the irradiating light should be reflected again by the outer surface of the top panel 122, the resulting reflected light is diffusely reflected to be weakened and dazzle can be effectively suppressed since the top panel 122 is pearskin-finished.

Further, since the interior of the image reading unit housing 12 that can be seen through the first glass 241 is also in the dark color, it is possible to make the document P1 further visually stand out and the placed state of the document P1 can be more easily visually confirmed. The reflected light of the scanning light emitted form the irradiation lamp 231 in the interior of the image reading unit housing 12 can be absorbed in the housing 12, wherefore it can be suppressed that the user feels dazzled.

Figure 4A:
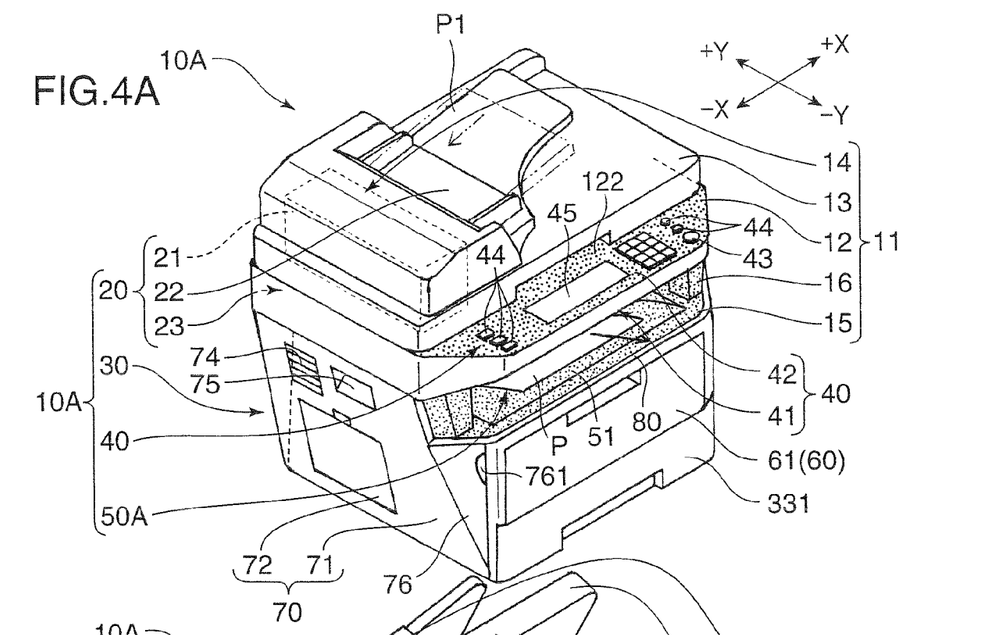
Figure 4B:
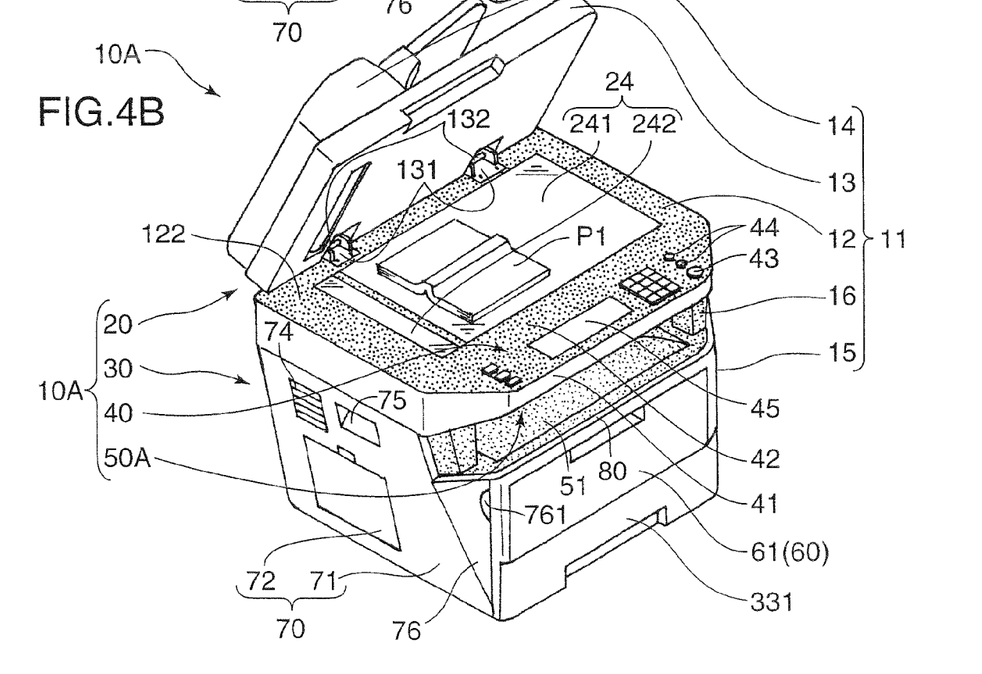

Next, a second embodiment of the present invention is described. FIGS. 4A and 4B are perspective views showing an image forming apparatus 10A according to a second embodiment of the invention, wherein FIG. 4A shows a state where a document pressing member 13 is closed and FIG. 4B shows a state where the document pressing member 13 is opened. In FIGS. 4A and 4B, the same parts as in FIGS. 1A and 1B are identified by the same reference numerals.

In the second embodiment, a sheet discharging unit 50A is also entirely in a dark color in addition to a top panel 122. This enables a sheet P discharged to a discharge tray 51 of the sheet discharging unit 50A to be easily visually confirmed. The image forming apparatus 10A is of the so-called internal discharging type, in which the sheet discharging unit 50A is formed between an image reading unit housing 12 and an image forming unit housing 15. Thus, it is originally difficult to visually confirm whether or not a sheet P has been discharged to the discharge tray 51 and visual confirmation is more difficult in some cases if the sheet discharging unit 50A (discharge tray 51) is in a light color. The sheet discharging unit 50A is in the dark color in order to avoid such a problem by a contrast between the dark color of the sheet discharging unit 50A and the white color of the sheet P.

Figure 5:
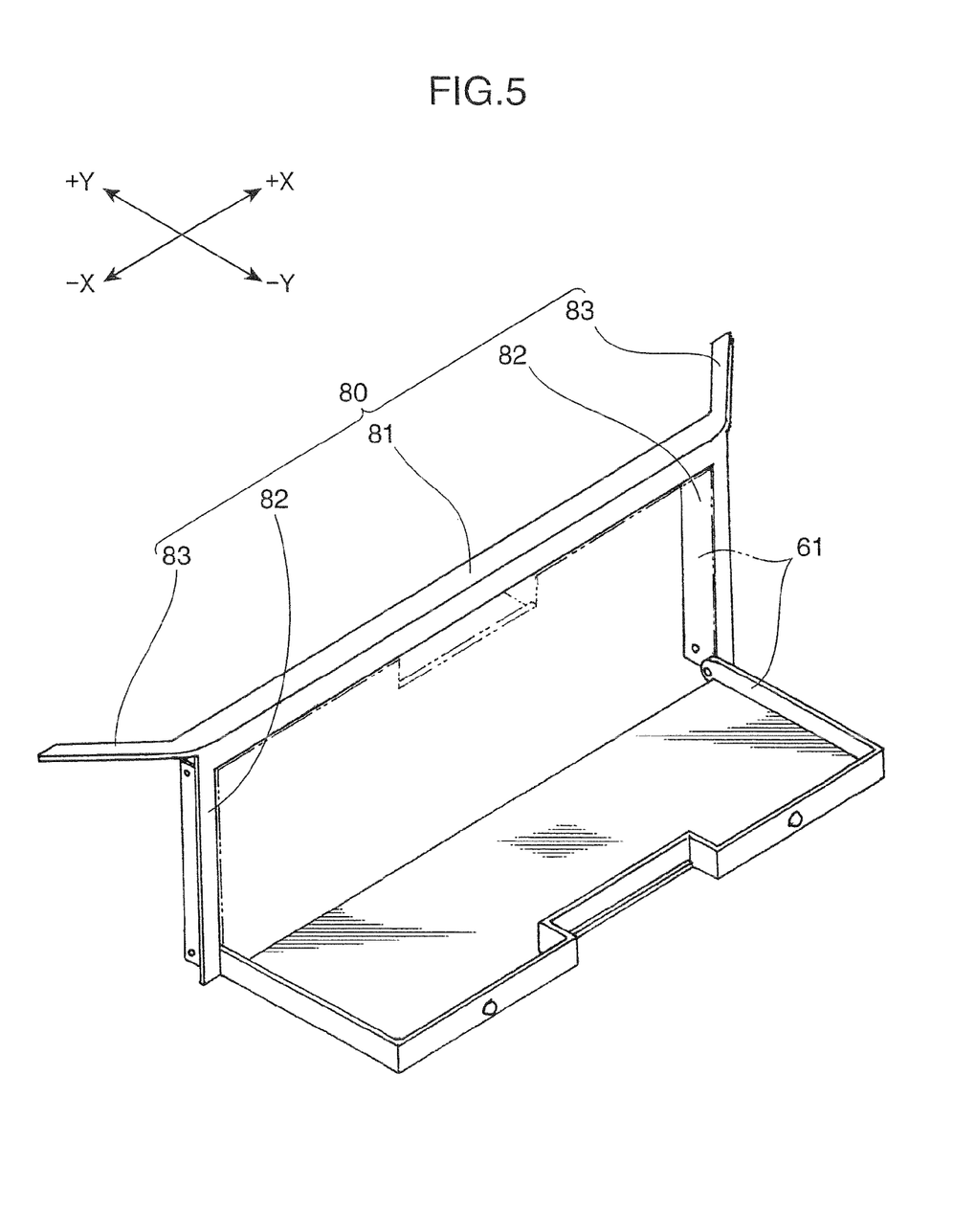
FIG. 5 is a perspective view showing a front frame in the second embodiment.

In the second embodiment, a front frame 80 is attached to the front surface of the image forming unit housing 15. FIG. 5 is a perspective view showing the front frame 80, wherein an open state of a manual feed tray 61 is shown by solid line and a closed state thereof is shown by chain double-dashed line.

The front frame 80 includes an upper beam 81, hanging columns 82 and extending plate pieces 83. The upper beam 81 is mounted in close contact with the upper front edge of the image forming unit housing 15 and has an L-shaped cross section. The upper beam 81 is assembled substantially at the same height as the discharge tray 51. The hanging columns 82 are a pair of left and right members hanging down from the respective left and right ends of the upper beam 81 and mounted on left and right vertical edge plates of the image forming unit housing 15. The extending plate pieces 83 are pair of left and right members extending backward from the left and right ends of the upper beam 81 while widening the spacing therebetween and placed on left and right horizontal edge plates at a front upper part of the image forming unit housing 15. The manual feed tray 61 is provided between the pair of hanging columns 82.

The front frame 81 is in a light color such as a light cream color or a light gray color similar to the outer surfaces of the document pressing member 13, an automatic document feeding unit housing 14 and the image forming unit housing 15. Such a light-color front frame 80 is arranged before the dark-color sheet discharging unit 50A.

Figure 6:
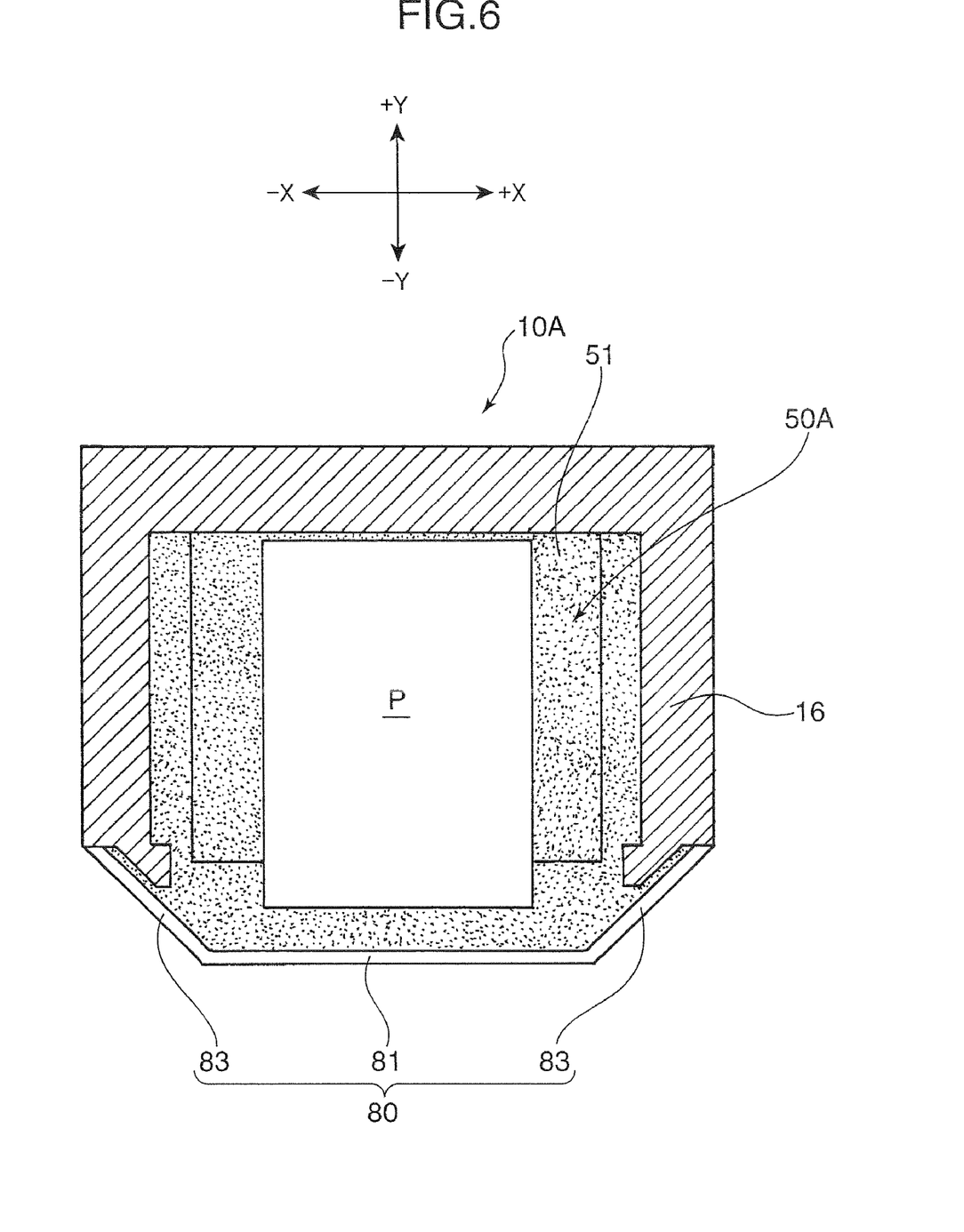
FIG. 6 is a plan view of a sheet discharging unit in the second embodiment.

FIG. 6 is a plan view of the sheet discharging unit 50A in the second embodiment. As a result of mounting the front frame 80 on the front surface of the image forming unit housing 15, the discharge tray 51 and the surrounding dark-color parts are as if they were rimmed with the light-color front frame 80 and the end edge position of the sheet discharging unit 50A is emphasized. In other words, since the light-color front frame 80 is present at the front peripheral edge of the dark-color discharge tray 51, the end edge of the discharge tray 51 is made clear even in a dark illuminated environment, whereby the user's approach to the sheet discharging unit 50A is facilitated.

In addition, the sheet P discharged to the sheet discharging unit 50A can be made easily visually confirmable by contrast with the dark color of the sheet discharging unit 50A. Therefore, the sheet P can be more easily taken out from the sheet discharging unit 50A.

As described above, according to the second embodiment, it is possible not only to support the user by colors to enable the document P1 to be precisely placed when the user places the document P1 on the contact glass 24, but also to support the user by colors to enable the sheet P to be easily taken out when the sheet P after copying is taken out from the sheet discharging unit 50A.

Although the two embodiments of the present invention are described above, the present invention is not limited to the above embodiments and also embraces the following contents.

(1) Although the copiers are described as the image forming apparatuses 10, 10A in the above embodiments, the image forming apparatus may be a printer or a facsimile machine.

The image forming apparatuses 10, 10A are not limited to those for black and white printing and may be those capable of color printing. Further, the image forming apparatus may be a so-called complex machine (MFP) provided with the respective functions of a copier, a printer and a facsimile machine.

(2) In the above embodiments, the conveying direction of the document P1 in the document reading unit 20 and that of the sheet P in the image forming unit 30 are set orthogonal to each other. Instead, the conveying direction of the document P1 in the document reading unit 20 and that of the sheet P in the image forming unit 30 may be set to be the same direction.

(3) In the above embodiments, the top panel 122 of the image reading unit housing 12 is in the dark color. The document pressing member 13 and the automatic document feeding unit housing 14 may also be in the same dark color as the top panel 122.

(4) In the above embodiments, the lateral width of the image reading unit housing 12 is set larger than that of the image forming unit housing 15. The lateral width of the image reading unit housing 12 may be equal to or conversely smaller than that of the image forming unit housing 15.

(5) In the above embodiments, the automatic document feeder 21 housed in the automatic document feeding unit housing 14 is arranged on the document pressing member 13. Instead, the image forming apparatus 10 may be of the type not provided with the automatic document feeder 21. In this case, only the first glass 241 is provided in the top panel 122 of the image reading unit housing 12 as the contact glass 24 without providing the automatic feed glass 242.

(6) In the above embodiments, the outer surface of the top panel 122 is pearskin-finished. Besides this pearskin finish, wood grain finish, rock-like finish, sand-like finish or geometric pattern may be applied.

The above specified embodiments mainly embrace inventions having the following constructions.

An image forming apparatus according to one aspect of the present invention comprises an image reading unit for reading the image information of a document; and an image forming unit arranged below the image reading unit for performing a specified image forming process based on the image information read by the image reading unit, wherein the image reading unit includes a contact glass on which a document to have image information read therefrom is to be placed; an image reading unit main body on which the contact glass is mounted; a document pressing member openable and closable to press a document placed on the contact glass; and an optical member for optically scanning a document surface of the document placed on the contact glass to read as a document image, wherein the image reading unit main body includes a top panel formed with an opening covered by the contact glass and the outer surface of the top panel is in a dark color.

According to this construction, since the top panel around the contact glass is in the dark color, contrast between the dark-color top panel and the light-color document becomes clear with the document placed on the contact glass. Thus, a user can quickly judge whether or not a placed state of the document is proper. As a result, the operability of a copying operation can be improved and an inconvenience of forming an oblique toner image on a sheet can be prevented.

Further, if dust deposits on the contact glass, it stands out due to contrast with the dark color around. This immediately triggers the user to remove the dust, wherefore an image defect resulting from the presence of dust can be eliminated. In addition, since the reflected light of light from a light source is suppressed by the dark-color part, it can be made more difficult that the reflected light is incident on an image sensor provided in the optical member. This can prevent the occurrence of such an inconvenience that erroneous image information is taken due to flare light.

In the above construction, the outer surface of the top panel is preferably pearskin-finished. According to such a construction, the light having reached the top panel is diffusely reflected by the pearskin-finished top panel, whereby dazzle can be further suppressed.

In the above construction, the interior of the image reading unit main body that can be seen through the contact glass is preferably in a dark color. In this case, the image reading unit main body is a housing having a bottom plate and a part of the bottom plate can be seen through the contact glass, wherefore the bottom plate is preferably in the dark color.

According to this construction, a document placed on the contact glass can more visually stand out and the placed state of the document can be more easily visually confirmed. Further, the reflected light of scanning light in the interior of the image reading unit main body can be absorbed and it can be suppressed that the user feels dazzled.

In the above construction, the lightness of the color of the top panel is preferably 2 or lower in the Munsell value of the Munsell chart (JIS). According to this construction, the color of the top panel can be sufficiently dark and sufficient contrast with normal white documents can be ensured.

In this case, a difference in lightness between the color of the top panel and the color of a part surrounding the top panel is preferably 3 or higher in the Munsell value of the Munsell chart (JIS). According to this construction, the difference between the color of the top panel and that of the part surrounding the top panel can be visually clearly and sufficiently distinguished.

In the above construction, it is preferable to further comprise a sheet discharging unit, to which a sheet having the image forming process performed thereto is discharged, wherein the sheet discharging unit is in a dark color, and a strip-shaped light color zone in a light color is formed on a peripheral edge of the sheet discharging unit. This sheet discharging unit may be arranged between the image forming unit and the image reading unit.

According to this construction, it is possible not only to support the user by colors so that a document can be easily precisely placed when the user places the document on the contact glass, but also to support the user by colors so that a sheet can be easily taken out when the sheet after copying is taken out from the sheet discharging unit.

In the above construction, it is preferable that a front frame mounted on the front surface of the image forming unit is further provided; that the sheet discharging unit includes a discharge tray for receiving a sheet; that the discharge tray is in a dark color; that a part of the front frame is light colored as the light color zone and assembled substantially at the same height position as the discharge tray.

According to this construction, since the front frame is present as the light color zone on the front peripheral edge of the dark-color discharge tray, an end edge of the discharge tray is made clear even in a dark illuminated environment and the user's approach to the sheet discharging unit can be facilitated.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

This application is based on Japanese Patent Application Nos. 2007-318262 and 2007-318264 filed on Dec. 10, 2007, respectively, the contents of which are hereby incorporated by reference.

What is claimed is:

1. An image forming apparatus, comprising:
an image reading unit for reading the image information of a document; and
an image forming unit arranged below the image reading unit for performing a specified image forming process based on the image information read by the image reading unit,
wherein the image reading unit includes:
a contact glass on which a document to have image information read therefrom is to be placed;
an image reading unit main body on which the contact glass is mounted;
a document pressing member openable and closable to press a document placed on the contact glass; and
an optical member for optically scanning a document surface of the document placed on the contact glass to read as a document image,
wherein the image reading unit main body includes a top panel formed with an opening covered by the contact glass and the outer surface of the top panel is in a dark color and the outer surface of the top panel is pearskin-finished.

2. An image forming apparatus, comprising:
an image reading unit for reading the image information of a document; and
an image forming unit arranged below the image reading unit for performing a specified image forming process based on the image information read by the image reading unit,
wherein the image reading unit includes:
a contact glass on which a document to have image information read therefrom is to be placed;
an image reading unit main body on which the contact glass is mounted;
a document pressing member openable and closable to press a document placed on the contact glass; and
an optical member for optically scanning a document surface of the document placed on the contact glass to read as a document image,
wherein the image reading unit main body includes a top panel formed with an opening covered by the contact glass and the outer surface of the top panel is in a dark color and the interior of the image reading unit main body that can be seen through the contact glass is in a dark color.

3. An image forming apparatus according to claim 2, wherein the outer surface of the top panel is pearskin-finished.

4. An image forming apparatus according to claim 2, wherein:
the image reading unit main body is a housing having a bottom plate;
a part of the bottom plate can be seen through the contact glass, and
the bottom plate is in a dark color.

5. An image forming apparatus, comprising:
an image reading unit for reading the image information of a document; and an image forming unit arranged below the image reading unit for performing a specified image forming process based on the image information read by the image reading unit, wherein the image reading unit includes:

a contact glass on which a document to have image information read therefrom is to be placed;

an image reading unit main body on which the contact glass is mounted;

a document pressing member openable and closable to press a document placed on the contact glass; and an optical member for optically scanning a document surface of the document placed on the contact glass to read as a document image, wherein the image reading unit main body includes a top panel formed with an opening covered by the contact glass and the outer surface of the top panel is in a dark color and the lightness of the color of the top panel is 2 or lower in the Munsell value of the Munsell chart (JIS).

6. An image forming apparatus according to claim 5, wherein a difference in lightness between the color of the top panel and the color of a part surrounding the top panel is 3 or higher in the Munsell value of the Munsell chart (JIS).

7. An image forming apparatus, comprising:

an image reading unit for reading the image information of a document; and an image forming unit arranged below the image reading unit for performing a specified image forming process based on the image information read by the image reading unit, wherein the image reading unit includes:

a contact glass on which a document to have image information read therefrom is to be placed;

an image reading unit main body on which the contact glass is mounted the image reading unit main body including a top panel formed with an opening covered by the contact glass and an outer surface of the top panel being a dark color;

a document pressing member openable and closable to press a document placed on the contact glass;

an optical member for optically scanning a document surface of the document placed on the contact glass to read as a document image; and a sheet discharging unit, to which a sheet having the image forming process performed thereto is discharged, wherein the sheet discharging unit is in a dark color, and a strip-shaped light color zone in a light color is formed on a peripheral edge of the sheet discharging unit.

8. An image forming apparatus according to claim 7, wherein the sheet discharging unit is arranged between the image forming unit and the image reading unit.

9. An image forming apparatus according to claim 7, further comprising a front frame mounted on the front surface of the image forming unit, wherein:

the sheet discharging unit includes a discharge tray for receiving a sheet;

the discharge tray is in a dark color; and a part of the front frame is light colored as the light color zone and assembled substantially at the same height position as the discharge tray.

10. An image reading apparatus for reading image information of a document, comprising:

a contact glass on which a document to have image information read therefrom is to be placed;

a main body on which the contact glass is mounted;

a document pressing member openable and closable to press a document placed on the contact glass; and an optical member for optically scanning a document surface of the document placed on the contact glass to read as a document image, wherein the main body includes a top panel formed with an opening covered by the contact glass and the outer surface of the top panel is in a dark color and the outer surface of the top panel is pearskin-finished.

11. An image reading apparatus for reading image information of a document, comprising:

a contact glass on which a document to have image information read therefrom is to be placed;

a main body on which the contact glass is mounted;

a document pressing member openable and closable to press a document placed on the contact glass; and an optical member for optically scanning a document surface of the document placed on the contact glass to read as a document image, wherein the main body includes a top panel formed with an opening covered by the contact glass and the outer surface of the top panel is in a dark color and the interior of the image reading unit main body that can be seen through the contact glass is in a dark color.

12. An image reading apparatus according to claim 11, wherein:

the main body is a housing having a bottom plate;

a part of the bottom plate can be seen through the contact glass; and the bottom plate is in a dark color.

13. An image reading apparatus for reading image information of a document, comprising:

a contact glass on which a document to have image information read therefrom is to be placed;

a main body on which the contact glass is mounted;

a document pressing member openable and closable to press a document placed on the contact glass; and an optical member for optically scanning a document surface of the document placed on the contact glass to read as a document image, wherein the main body includes a top panel formed with an opening covered by the contact glass and the outer surface of the top panel is in a dark color and the lightness of the color of the top panel is 2 or lower in the Munsell value of the Munsell chart (JIS).

14. An image reading apparatus according to claim 13, wherein a difference in lightness between the color of the top panel and the color of a part surrounding the top panel is 3 or higher in the Munsell value of the Munsell chart (JIS).

\* \* \* \* \*